(12) United States Patent
Schimmer et al.

(10) Patent No.: US 7,587,322 B2
(45) Date of Patent: Sep. 8, 2009

(54) ROBUST SPEECH RECOGNITION WITH DATA BANK ACCESSION ORGANIZED BY SEMANTIC ATTRIBUTE

(75) Inventors: Klaus Schimmer, Zirndorf (DE); Peter Plankensteiner, Erlangen (DE); Stefan Harbeck, Kleinsendelbach (DE)

(73) Assignee: VoiceCom Innovations GmbH, Nuremberg (DE)

( * ) Notice: Subject to any disclaimer, the term of this patent is extended or adjusted under 35 U.S.C. 154(b) by 599 days.

(21) Appl. No.: 10/415,709

(22) PCT Filed: Oct. 31, 2001

(86) PCT No.: PCT/EP01/12632

§ 371 (c)(1),
(2), (4) Date: Oct. 21, 2003

(87) PCT Pub. No.: WO02/37473

PCT Pub. Date: May 10, 2002

(65) Prior Publication Data

US 2004/0148167 A1      Jul. 29, 2004

(30) Foreign Application Priority Data

Nov. 3, 2000   (DE)   ................... 100 54 413
Feb. 16, 2001  (DE)   ................... 101 07 336

(51) Int. Cl.
*G10L 15/00* (2006.01)
*G10L 15/18* (2006.01)
*G10L 21/00* (2006.01)
(52) U.S. Cl. .................... 704/257; 704/275
(58) Field of Classification Search .......... 704/9, 704/231, 252, 257, 275
See application file for complete search history.

(56) References Cited

U.S. PATENT DOCUMENTS 5,797,116 A * 8/1998 Yamada et al. ............... 704/10

(Continued)

FOREIGN PATENT DOCUMENTS

WO       WO 0014727       3/2000

OTHER PUBLICATIONS

Niesler, T.R., "Category-based statistical language models, PhD thesis," Jun. 1997, Dept. Engineering, Unv. Of Cambridge, U.K., XP002169563, Chapters 1-6 (including the References and Appendix A-H.

(Continued)

*Primary Examiner*—Angela A Armstrong
(74) *Attorney, Agent, or Firm*—Hunton & Williams, LLP (57) ABSTRACT

A method for controlling an information system during the output of stored information segments via a signaling device ($50a$). Useful information is stored in a database ($32$) for being requested, from which information at least one information segment is specified as a first data segment (W1) via a first voice signal ($s_a(t), s_a(z)$) and is provided via a control output ($20, 40, 50; 50a$) or is converted ($50b$) into a control signal for a technical device (G). The information is organized in the database such that an initially limited first information area ($32a$) of stored information is accessible ($4, 4a, 4b$) to said voice signal, for selecting the specified information segment therefrom. A further information area ($32b, 32c, 32d$) of said database ($32$) is activated ($59, 70, 4c, 4d$) as a second information area, if the information segment (W1) corresponding to a first voice signal segment (s1) of said first voice signal ($s_a(t)$) is not contained in said first information area ($32a$). When accessing information of the database, a robust word recognition is obtained and the request is successfully processed within a short time.

26 Claims, 4 Drawing Sheets

U.S. PATENT DOCUMENTS

| | | | | | |
|---|---|---|---|---|---|
| 5,940,793 | A | * | 8/1999 | Attwater et al. | 704/231 |
| 6,324,513 | B1 | * | 11/2001 | Nagai et al. | 704/275 |
| 6,629,069 | B1 | * | 9/2003 | Attwater et al. | 704/231 |
| 2002/0178008 | A1 | * | 11/2002 | Reynar | 704/272 |

OTHER PUBLICATIONS

Nöth, E. et al., "Research issues for the next generation spoken dialogue systems," Text, speech and dialogue: Second International Workshop Proceedings/TSD '99, Plzen, Czech Republic, Sep. 1999, pp. 1-9.

Pacak, M. G. et al., "Automated morphosyntactic analysis of medical language," Information Processing & Management, vol. 12, pp. 71-76, 1976.

Gallwitz, F., "The erlangen spoken dialogue system EVAR: a state-of-the-art information retrieval system," *Proceedings of 1998 International Symposium on Spoken Dialogue (ISSD 98), 10 pages, Sydney, Australia*, 1998.

Gallwitz, F. et al., "Recognition of Out-of-Vocabulary words and their semantic category," XP002169562, 8 pages, Apr. 1997.

Sheryl R. Young, "Estimating recognition confidence: methods for conjoining acoustics, semantics, pragmatics and discourse," Sep. 18-22, 1994, XP000855714, ICSLP 94, (International Conference Spoken Language Processing), pp. 2159-2162.

International Search Report dated Feb. 19, 2002 for International Application PCT/EP01/12632.

\* cited by examiner

ROBUST SPEECH RECOGNITION WITH DATA BANK ACCESSION ORGANIZED BY SEMANTIC ATTRIBUTE

RELATED APPLICATIONS

This application claims priority to German Patent Application No. 100 54 413 4, filed on Nov. 3, 2000; German Patent Application No. 101 07 336 4, filed on Feb. 16, 2001; and PCT International Application No.. PCT/EP 01/12632, filed on Oct. 31, 2001, entitled "Robust Voice Recognition With Data Bank Organization", the contents of which are hereby incorporated by reference herein in their entirety.

The invention relates to a method for controlling a system supplying information, the input to said information system being a voice control. Certain information data (information segments) of a database are acceded and recalled (specified and selected) by voice, said database providing one of an initiating function of a device and a perceivable information on said information segment via an output path. Both results are designated as "output of information".

In order to make information available by an audio inquiry, the inquiring person must be permitted to inquire by speaking as naturally as possible. Simultaneously, a database and voice recognition system behind an audio inquiry must designed robustly to achieve a natural interface between man and machine, in order to provide correct information or to cause correct functions, and in order not to make an inquiring person wait too long for an information or a requested function of the device, thus to react quickly. According to prior art, there are different approaches of increasing the robustness of a voice recognition system, e.g. an improved acoustic modeling of words, compare Schukat/Talamazzini in "Automatische Spracherkennung—Grundlagen, statistische Modelle und effiziente Algorithmen", Vieweg, 1-995, pages 199-to 230. Improved linguistic and semantic speech models are another possibility. However, it has recently been found that both approaches according to prior art only provide an insignificant reduction of the word error rate, which shall be improved.

In order to explain the complexity of a voice recognition, the essential criterion of optimizing speech models, namely perplexity, shall be referred to. Perplexity describes an average branching degree of a language or voice. If perplexity is low, the quantity of words, which can possibly follow a recognized word, decreases simultaneously. For dictation recognition systems, which can normally recognize and process a very large vocabulary of more than 60,000 words, a suitable speech model can considerably reduce the complexity of searching an optimum word chain. For an information inquiry, the basis is similar, a voice interface exists which records an inquiry and shall providethe related information from a database or carry out a corresponding action. A number of attributes, which shall be filled with different definitions by said voice recognition, generally defines an inquiry in acoustic form. The field content of a database required for a recognition possibly assumes a plurality of different values, e.g. all forenames or all surnames in case of a telephone information system, or the names of all cities in case of a traffic information system, so that a high degree of branching of the language or voice is present exactly at a point that is critical for an information retrieval, i.e. a very large number of hypotheses to be checked by a voice recognition (word recognition) is present. Due to said large number of hypotheses to be regarded, the probability of associating incorrect data (of the database) to an attribute increases on the one hand, on the other hand, the processing time for a decoding (recognition) of a verbal statement, i.e. a voice signal, increases.

From WO-A 00/14727 (One Voice Technology), an interactive interface is known which recognizes speech and which is applied in connection with said interface between a verbal statement and a user interface of a computer. Two "grammar-files" are used, compare pages 4, 5, one special file of which is initially used as a first database, for subsequently acceding to a second (more general) database with the complete spoken statement in order to retrieve a possible deficiency of recognized words or sense. An interactive inquiry is used for this purpose, said interactive inquiry in case of a negative recognition error in the first database offering a recognized sentence/sense (a "prompt") to the user, which sentence/sense had a maximum confidence value in the first word recognition. depending on a then required input of the user (Yes or No), either a global offer of a certain context is listed on the screen, compare page 17, last paragraph, or, if the inquiry is confirmed, a control of the computer is effected depending on the recognized sense. It is disadvantageous that a re-inquiry at the user (prompt) is regularly required and that the system is only able to recognize reliably, when the user has confirmed the content of the recognized sentence with a maximum confidence.

A technical problem of the invention is to provide a word recognition system for access to information of a database (by which also other data sources are understood), which recognition system is as robust as possible, and to process an inquiry successfully in a shortest possible time. This shall also be possible when the definitions of the parameters required for a specification of the database inquiry are of various types, which increases the probability of a recognition error of exactly said definitions.

The invention solves said problem. The basic idea of the invention is that a grouping/structuring of a database into smaller segments is of advantage. A word recognition can be processed more robustly, if, within an initially activated database segment (a limited first information area) the number of definitions is reduced. Thus, a more robust and more rapid system is obtained, which responds more rapidly to an inquiry or effects a desired action more rapidly.

A partition into database segments (designated as limited information areas in the claim) can for example be influenced by certain user or user group profiles which preferably have influence on the first information area which is initially activated.

By limiting possible branchings, the degree of branching is reduced and the alternatives for a more rapid evaluation by the word recognition are reduced.

Initially, a first information area of a database is activated, from which an information segment is requested via a first voice signal. Said information segment corresponds to a voice signal segment of a complete voice signal (or vice versa). For example, a relevant voice signal segment can be a surname "Meier" or Fisher", the related information segment being a certain telephone number stored in the database. Another alternative would be a voice signal segment "Nuemberg" or "New York", to which voice signal segment, train connections have to be retrieved, so that the related information segment can be departure times of trains, when the departure station is determined before.

The database is organized to initially make a limited area of stored information accessible for the voice recognition. If a specified information (corresponding to the voice signal segment) cannot be deserved by said area, i.e. if said information can not be selected from said area, or if a confidence value, characterizing the reliability, is below a threshold value, a further information area is activated instead of said first information area. Said further information area can be larger, displaced or totally different.

Said second (further) information area can be expanded to a third information area, if no corresponding information segment in said second information area can be associated to said voice signal segment.

If an association to a voice signal segment of the voice signal is not possible in a presently accessible (or activated) information area, at least an attribute is associated to said voice signal segment for evaluation, said attribute being determined from one out of several semantic categories, for said determination compare Gallwitz, Noeth and Niemann, "Recognition of Out-of-vocabulary Words and their Semantic Category", Proceedings of the $2^{nd}$ SQEL Workshop on Multi-lingual Information Retrieval Dialogs, Plzen, April 1997, pages 114 to 121. The semantic categories replace the concrete relation to an information segment in a database. They correspond to attributes, which describe types of unknown words, particularly of words, which were not recognized with a sufficient confidence.

A consequence of said evaluation of attributes is an expansion of the vocabulary of the database, thus a modification of the information area that is made accessible to the voice and word recognition. In this respect, at least a non-recognized signal segment is evaluated, which signal segment is already available and does not have to be recorded again. Said signal segment is less perplex, particularly its temporal length is shorter, and can be evaluated more rapidly and more reliably by said voice recognition.

The expansion can depend on the attribute, particularly on the semantic category, which is associated to the unknown voice signal segment . Said dependency is at least a co-dependency, not an exclusive dependency. Despite an initially limited information area of the database, the semantic categorization permits to rapidly and robustly associate a definition or correspondence of the database, said data being desired as a specific information segment. The number of allowed word chains (the degree of branching) is considerably reduced due to this kind of inquiry, and therefore the plurality of hypotheses to be regarded, so that the probability of attributing a wrong definition is reduced and the processing speed can be increased.

Said new evaluation of an already available voice signal segment of said first voicesignal can also be regarded as a "re-analysis", for which not again the complete content of the preceding voice signal is brought in connection with the second selected information segment, but only an already available signal segment, the confidence value of which was not sufficiently high, "is connected" again with said second information area for a recognition. The dependency of the second information area on the attribute is a possibility of improving the recognition without requiring the user to act again, to respond to a "prompt" (system inquiry), or to be asked ("prompted") for a supplemental lingual information. A system operating in this manner is more intelligent and makes multiple use of available information, thus re-analyzes said information, and that not completely, but only at least one part thereof. Said part may also comprise two or more parts that were not recognized with a sufficient confidence, so that a selection of a further information area can depend on at least one attribute, but also on two attributes. Therefore, the selection of the second information area is at least co-determined by the attribute of the signal segment which has not been recognized with sufficient confidence (in a time interval).

When dividing said two recognition stages with a limited first information and with a further information area in an analysis and in a re-analysis (a first and a second analysis, and possibly subsequent analyses, it is evident that the voice system appears to the user to be more robust and more independent, than with a necessary further inquiry as described above.

This does not exclude that in case of a failure of a search structure controlled in this manner, a dialog structure follows later, when the dependency on the attribute does not result in recognition with a sufficient confidence value in said further information area. Initially, however, said system is adapted to make a further recognition attempt using the described re-analysis, said re-analysis operating with a reduced signal segment from a signal that is already available.

Another possible consequence of an attribute evaluation is a signal output adapted to, influenced by, or depending on the semantic category, as a request to receive a new voice signal from the user. Said signal is usually less perplex, particularly of a shorter temporal length, and can be evaluated more rapidly and more reliably by the voice recognition system.

A corresponding arrangement, comprising circuits or realized by software in connection with a program, effects the described method stages, so that it is evident, which functional elements are used e.g. for the initially limited allowable information, and for a subsequent permission of access to an expanded information area, for retrieving an unknown voice signal segment replaced (specified) by a category.

An output can be made by an action, visually, or acoustically, said output is perceivable.

The control of the device can be realized in a telephone system, establishing a connection with a desired interlocutor who is registered in a database by a telephone entry, said entry being the information segment addressed by a voice signal.

The attributes (the semantic categories) characterizing, replacing, or being associated to a voice signal segment, which is not available in a presently activated information area of a database, can for example be surnames, forenames, companies, departments, or functions, each of said attributes being for example represented by several OOV words or models and being correspondingly considered, when modifying the available information area.

Said several OOV models (OOV is an abbreviation for Out Of Vocabulary, thus missing of a corresponding word in a presently activated or available vocabulary of a database, which is available to the voice decoding as recognition vocabulary) can refer to different languages, thus one model for e.g. German and one for English. Said recognition supports the recognition of a semantic category of the word, which was not recognized or recognized with insufficient confidence, said word corresponding to a voice signal segment of a voice signal.

An OOV model is an acoustic model in which different part models are connected in parallel. Part models as acoustic models (or phonemic models) are used, which models can be language-dependent. An OOV model comprises several part models which cooperate with a kind of transition probability, said probability providing information on the probability of transition from one part model to another part model, said part models being elements of said OOV model. The completeness of an OOV is a result of the total of all part models and of an evaluation or predetermination of transition probabilities between said part models.

As an explanation, it is mentioned that a not-recognized status or a not-contained status in the activated database area is represented by a threshold value comparison. In this respect, the basic thesis is that an insufficient confidence value, which is below a threshold value, corresponds to a not-recognized or not-contained status. If the confidence value is above a threshold value, which can for example be between 80% and 95%, a signal segment is assumed to be correctly recognized, and the related database segment is output by an action, visually, or acoustically, so that the result is perceivable with respect to its general sense.

If a confidence value could not exceed a threshold value inquiry, if therefore the confidence is insufficient, a semantic category determined or made available during voice decoding has to be taken as a basis, instead of a recognized signal segment, said semantic category being a more general attribute of the voice signal segment. Said category can already be determined during voice recognition, but it can also be determined later, when the confidence value is too small for word recognition.

Therefore, an evaluation of the semantic category is preferably provided for determining a "system response". Said system response as an inner system adaptation either resides in a modification of the information made accessible by a database for a voice signal recognition, or in an outside perceivable system response by a perceivable output, which is dependent on the semantic category. A "correspondence to a first voice signal segment" is for example a semantic category.

When a segment or interval of the voice signal is the term "Fischer" or "New York", the corresponding semantic category is "surname" or "city". Insofar, the term "substantial interval or segment" is to be understood as the segment or interval of the voice signal which segment or interval is to be recognized by the voice recognition to request the use(ful) information from the database. It is exactly because the confidence value is too small, that a sufficiently reliable association to the database segment could not be obtained, and the subsequent stage according to the invention, is an evaluation of a further attribute, said attributes comprising both the confidence value and the semantic category. A recognized word is not an attribute, because insofar, the first attribute (confidence value), by exceeding the threshold value, indicated that a sufficient confidence of having recognized the correct word is present.

Of course, a voice signal can be provided in an analog or in a digitized form. It does not have to be currently pronounced, but the first signal can be available as a voice file, and it can also be supplied over a larger distance via a transmission channel. Said signal is processed by a decoding means, which can be designated as voice recognition (recognizer, word recognizer), which voice recognition is known in prior art as a model and an algorithm, compare Schukat/Talamazzini, "Automatische Spracherkennung—Grundlagen, statistische Modelle und effiziente Algorithmen", Vieweg 1995, as mentioned above.

A dialog control can help to simplify complex recognition problems. A first and a second voice signal are taken as a basis.

The first voice signal is the signal by which the desired information segment shall be specified. If said information segment cannot be made accessible due to a modification of the available information area, if particularly attributes for non-recognized voice segments alone do not help, a perceivable output is effected as a feedback.

A non-recognized segment of a voice signal causes an optical or acoustic information that depends on the attribute the non-recognized voice signal segment has. If a surname is concerned, a name can concretely be requested. If a city or a holiday destination is concerned, an adapted perceivable feedback to the user can take place. The concrete word itself can be included as a voice signal segment in said feedback.

Then, a second voice signal is expected by the recognition procedure second alternative), which voice signal considers said inquiry, the expected scope of perplexity (or the degree of branching) being very small, so that the complete use information of the database can be made available for the word recognition. However, this area can be limited to an area determined by the attribute (the category) of the non-recognized voice signal segment. Reasonably, also a much shorter signal length can be assumed, which corresponds practically completely to the substantial signal segment to be recognized.

Said process can be repeated until a suitable correspondence of the attribute is found in the stored vocabulary of the database. If this cannot be achieved, the process changes to the first stage first alternative), outputs a standard inquiry, and repeats the at least single step-wise expansion of the information area.

The output of a system information for requesting a second voice signal to be provided, which request is oriented such that the second voice signal is a repetition of the first signal that cannot be evaluated, represents a relapse position.

The iterative determination (analysis, re-analysis) of the specific information segment can operate without a dialog request; if, in this case, no definite association of the not yet determined voice signal segment to an information segment is obtained after reaching the last stage, i.e. the complete information area of the database, a dialog information can also be output in this case, for requesting a second voice signal with a considerably reduced perplexity. A completely automatically operating variant is to start at the first information area again with an analysis and a (at least one) re-analysis, without a dialog structure.

The first information area can be adapted to a user (also to a group of users), by recording specific information segments of a user who is known in said database with regard to his behavior or his characteristic features (insofar with regard to at least one feature), such as preferred connections, usual interlocutors, speech behavior, dialog behavior and the like. Said profile-oriented control of the first data area (of the first activated information area) helps to limit the perplexity of the complete voice signal to the relevant information as signal segments, which are to be acceded in expanded information areas for correspondences.

If the search is successful, a corresponding input can be made to the profile of the currently connected user, to allow a direct access for the next use. The information frequently acceded by a specific user (also in the sense of a user group), can be made available quickly and robustly, and simultaneously, an access to rare information is provided.

The invention is described in more detail and supplemented by embodiments.

Figure 1:
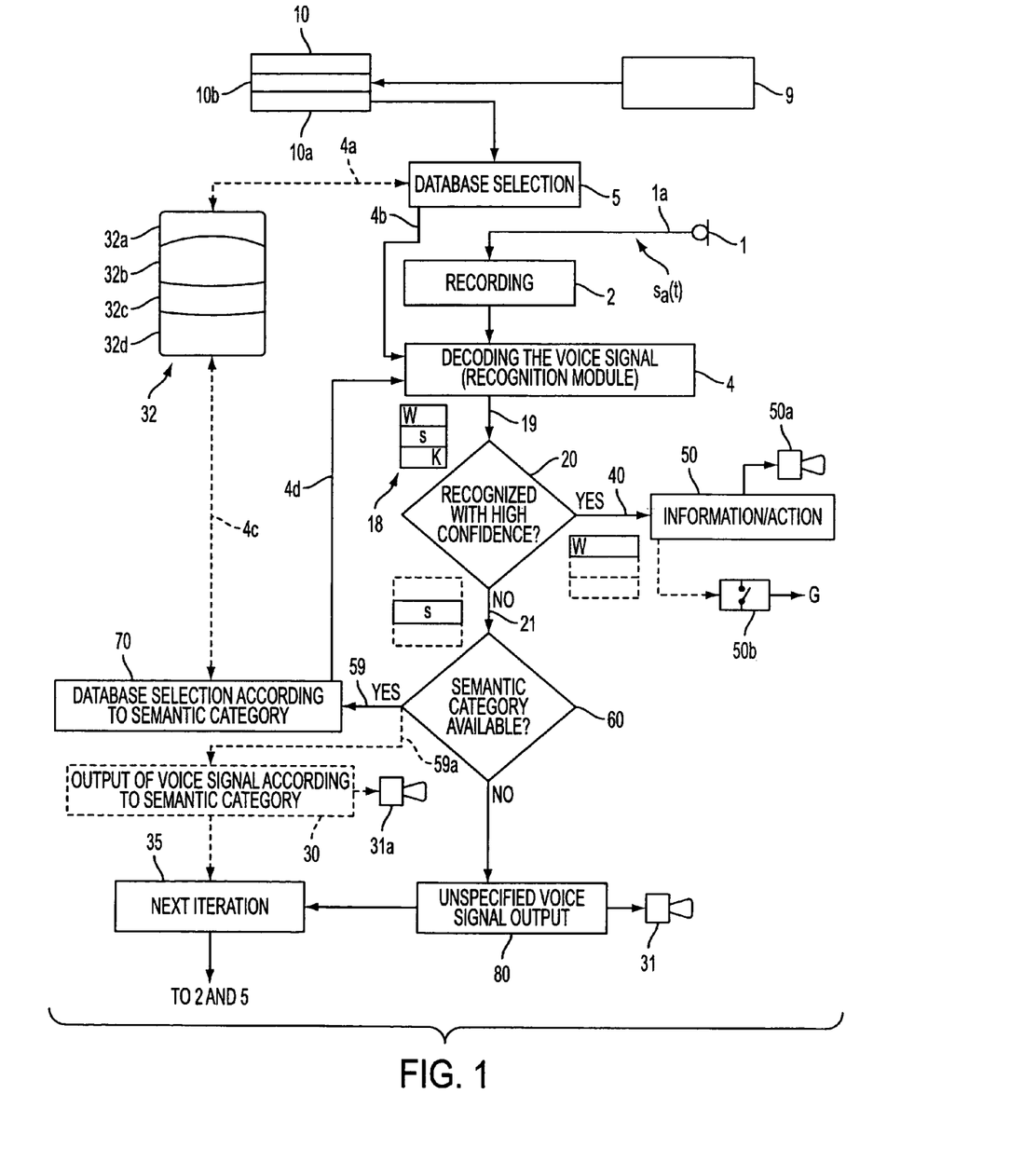
FIG. 1 shows a diagram, which is a mixture of a block diagram and a functional sequence chart, in the sense of a flow diagram.

The embodiment of FIG. 1 illustrates a structure of a database system comprising an acoustic inquiry means via a channel 1a. Said illustrated structure can be realized by software. In parallel, FIG. 1 simultaneously is a kind of flow diagram illustrating how the inner logic of the system operates.

Figure 2:
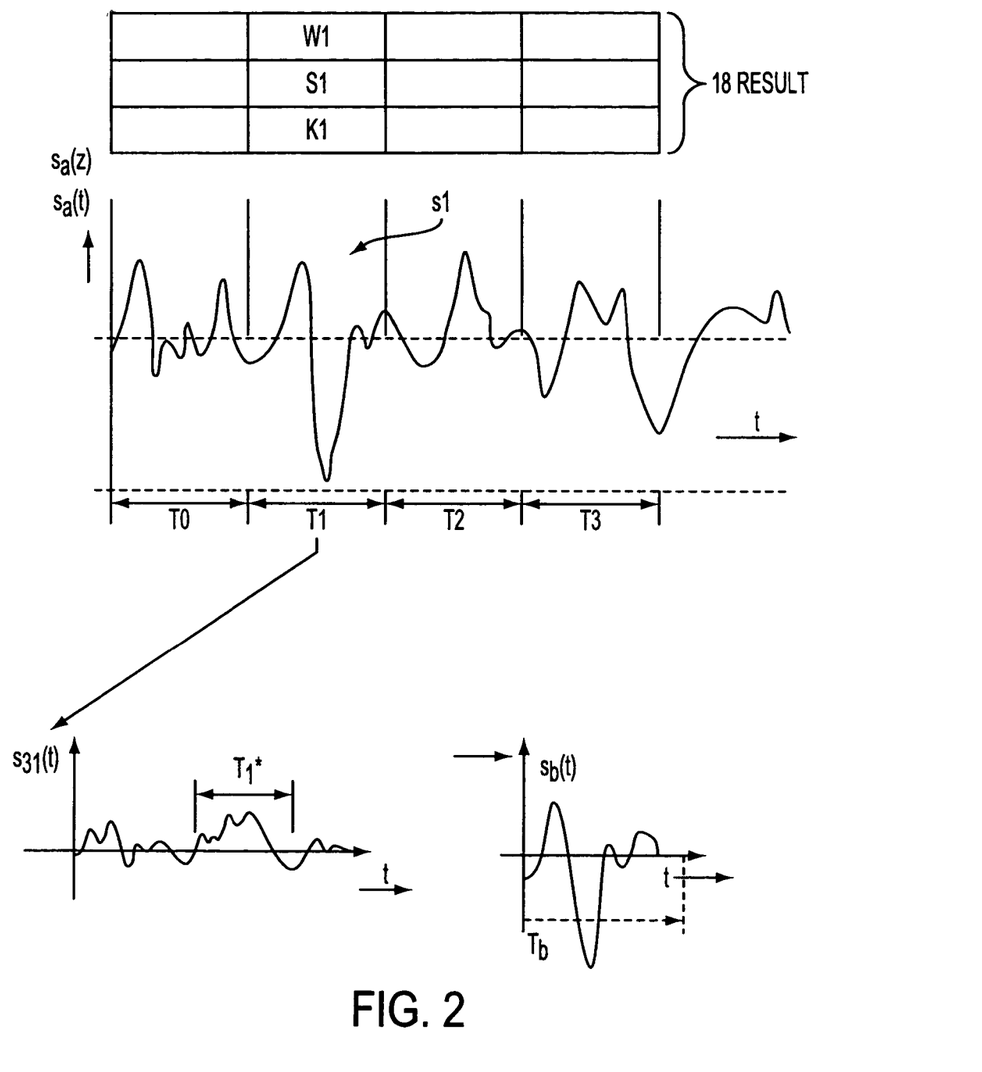
FIG. 2 is a voice signal $s_a(t)$, which is illustrated as an analog signal and comprises a voice signal segment s1 during a time interval T1.

A voice signal $s_a(t)$ as an analog signal or as a digitized signal $s_a(z)$ is schematically illustrated in FIG. 2. Said voice signal is recorded over a microphone 1 by a means 2; it can also be provided as a file or supplied via a transmission channel. A possible realization of FIG. 1 in a concrete embodiment is a telephone system, which provides information 50a via a functional block 50, alternatively starts a function 50b, or establishes a dialed connection. Said "action" shall characterize the control of the device, in the following reference being generally made to providing information or to an output of information contained in a database 32.

Said microphone 1 is specifically illustrated at an input, but not said transmission channel or said file comprising said voice signal, so that simply an input to a decoder 4 is taken as a basis which decoder is supplied with a voice signal (of optional origin). Decoding corresponds to a conversion of voice into text using a word recognition means 4 (word recognition or voice recognition), additionally attributes being determined, such as a semantic category S1 of a signal segment s1 or a confidence value K1 for reliably recognizing a word W1.

A database 32 as illustrated comprises several areas 32a, 32b, 32c, and 32d, characterized by different stored information. Said information is made accessible to a decoder 4, which, based on its voice model, tries to associate ("allocate" or "assign") word terms of said database to voice signals, better: to segments of a voice signal.

If, based on a voice signal, said decoder 4 correctly recognizes an inquiry, said correct recognition is signalized via a control line 40, by which correct recognition, information 50a is provided or an action is initiated by a functional block 50b. If a spoken statement (as a voice signal $s_a(t)$) is not completely recognized, functional paths 59,59a are used via 21 and 60, said functional paths being explained later.

The embodiment can serve as an exchange system, e.g. by telephone, which upon indication of a name establishes a connection with the indicated person. Said database 32 contains all names, companies, forenames, possibly departments or functions, additionally standard words are contained which are applied in normal usage, for example terms like "what", "I", "Mister", "Misses", and different welcome phrases. Said standard words are comprised in a first information area 32a. Additionally, user-dependent features or properties are considered here. A user "Jack" identifies himself, or is authenticated on the basis of a signal of a secondary information 9, and releases a stored profile which is one of several profiles accessible in a memory 10. Said profile 10a, 10a, . . . is supplemented to said information area 32a, stored separately, or defines a certain portion of said information area 32a, which portion is adapted to the speaker of the voice signal, or corresponds to said speaker.

An initial basis is the usual case that, despite a plurality of stored data, according to experience, a user phones 200 to 400 persons at maximum, so that said user-dependent 200 to 400 persons are accessible over said first area 32a of information, when a profile 10a, 10b related to a certain user is selected.

According to an example, the operating process of a system response with a user inquiry is as follows. A system prompt is output via a loudspeaker 50a or via a channel for supply into a telephone receiver, said system prompt being for example "How can I help you?" The user responds by a first voice signal $s_a(t)$, for example "I want to talk to Mr. Mueller". The system proceeds to a voice recognition using said first supplied voice signal, whereby it is supposed that the signal segment s1 during a time interval T1 according to FIG. 2 corresponds to the term "Mueller" (as a semantic category: surname).

If the decoder 4 retrieves specific information data with respect to the voice segment "Mueller" (for example his telephone number) in said first information area 32a of said database 32, the system can select said data and respond to the inquiry by providing an information via a channel 20,40,50, for example "You are connected with Mr. Mueller".

The above described system process is the most desired, quickly operating way, for said voice recognition 4 (recognizing module) to recognize the recorded signal, from a microphone 1 via a signal supply 1a after recordation at 2, with such high confidence K1 that an allocation of the related stored data of the first information area 32a allows an output of the information for a signal path 40 (in this embodiment of a word W1, particularly of a telephone number corresponding to the word "Mueller" in the data base 32) to a control means 50 and a loudspeaker 50a. As schematically illustrated in said process control, at first an initial selection of the data base via a connection 4a,4b is effected by a function 5 provided for this purpose, i.e. a first data base area 32a is made accessible to a recognition means 4 via a data line 4b. Accessibility can also be provided by a transfer of the complete data block in a DMA procedure, so that said recognizing module 4 can have access to the data available in said data base area 32a.

According to the described embodiment of the telephone system, a correct recognition is to be supposed by recognizing the word "Mueller" with a supposed high confidence, i.e. with said confidence value K exceeding a minimum threshold value. In fact, said correct recognition causes two functions, namely an output of a system confirmation (you are connected with Mr. Mueller), and the performance of an action as an actuating reaction via 50b, for transmitting an information to a technical device G, the telephone system of the present embodiment, which effectively establishes a corresponding connection.

The attributes S,K marked in a schematically illustrated block 18 of recognition values show the result of the recognition module 4, which additionally provides a word recognition. Said two attributes are the semantic category S and the confidence value K which are associated to a time interval T1, as shown in FIG. 2, and to a marked signal segment s1 of a voice signal $s_a(t)$. A request 20 compares the attribute "confidence value" K1. In case the threshold is exceeded, the recognized word W1 is output via a path 40, or related relevant information is provided over a loudspeaker 50a, and/or a related action is provided for initializing a connection 50b. Therefore, only the portion W is transmitted by the recognition values 18, after evaluation of the second portion K.

How the time interval T1, which is the substantial portion of the signal with regard to the desired request, is calculated or determined, is not described in more detail here. Said time interval can be determined based on the complete signal, based on acoustic models, based on key words, or also based on a semantic analysis of the complete voice signal, as shown in FIG. 2. Such calculations have been described as prior art hereinbefore, so that the control is based on the fact that the determined use information W, S and K is available at an output 19 of said recognition 4, said comparison 20 evaluating the confidence value K of said use information and, provided that said confidence value is sufficient, forwarding said word W to an information output 50, in the above described sense.

If an entry "Mueller" is not present in said information area 32a of said supposed first user, if it is therefore not retrieved in a first data segment, the operating process of the system and the system response, respectively, are modified, supposing that no corresponding word entry W1 of said first area 32a can be allocated to the signal segment "Mueller" during the time interval T1. Therefore, the decoder 4 causes the signal segment s1 to be characterized over a line 19, by allocating the still unknown word to an attribute (semantic category). Said word corresponds to a type, thus to an attribute, which in this case is designated "surname". Via a loudspeaker 31a or via a line of the telephone receiver, an $s_{31}(t)$ output can be provided as a system response, that "the name you mentioned is not available in the telephone registry; to which person do you want to talk?" The attribute characterization allocates the unknown segment s1 of the voice signal to a semantic category. Due to said semantic categorization, the system outputs a specific inquiry 31a, modifying the system with regard to an expected second voice signal $s_b(t)$, which is illustrated in FIG. 2. For a new iteration, the system adapts itself at 35 to the second voice signal having a reduced perplexity, thus a smaller degree of branching of the syntax and the words, namely, the system only expects a surname. Normally, this signal segment $T_b$ is shorter in time and can be attributed substantially completely to a data base entry. For a subsequent voice recognition with the same decoding means 4, a larger information area, at any rate an at least partly different information area of the database, can be connected via 4c,4d or activated, thus the complete area 32 of all segments 32b, 32c, 32d, said first segment 32a, which is already present, remaining connected or being deactivated.

Due to the low perplexity, the term now supplied with the second voice signal $s_b(t)$ can reliably be retrieved in the modified area or in the complete file of use information, and a recognition can be signalized via a channel 40,50,50a.

The above-described operating method of the system as a modified system response (in the sense of an inner modification of the function) shall be described in more detail on the basis of the comparison with the confidence value in the request 20, which comparison is also described above. It is supposed that the confidence value is below the mentioned threshold value, which can be around 80%, 90%, or 95%, at any rate below 100%. Based on the thesis that an insufficient confidence value K1 for the "essential" portion s1 (essential in the sense of essential for the operating method and not required in the sense of a temporal long or large segment) corresponds to a non-recognition or a not-contained status of the searched word W1, a further attribute of the recognition result 18 is evaluated, namely the semantic category, which is designated S1 for the time interval T1 according to FIG. 2. Said semantic category is forwarded via a sequence path 21, corresponding to a signal path or a program expansion or branch, and transmitted to a control 60, inquiring whether a semantic category has been recognized by said recognition module 4. The semantic category was explained above. It corresponds to the type of the non-recognized word W1 in the segment T1. If such a category is present, the system can expand or branch in two paths, which are provided both alternatively and cumulatively. Said two expansions or branches are provided at 59 and 59a.

Path 59: If a semantic category is present, the access to the database 32 is modified with respect to the recognition module 4 by a functionality 70, that can be provided as a program or a process control. Said modification of access is provided via marked signal paths 4c and 4d, reference being made to making a second database segment accessible, as well as transferring the complete data of another database segment, e.g. of a segment 32b, to said recognition module 4. Said other database segment is explained symbolically in FIGS. 3, 3a, 3b, and 3c. Said function 70 effects a database selection in accordance with the present semantic category. This corresponds to a modification of the data segment 32a which has so far been available for said recognition. A completely different segment 32b can be connected, for example a segment containing all surnames. The database can be expanded, as symbolized by 32c. This corresponds to a larger database segment in a larger address segment. Finally, a partly overlapping combination 32d with said first data segment 32a of said memory 32 is possible, as shown in FIG. 3b.

Figure 3:
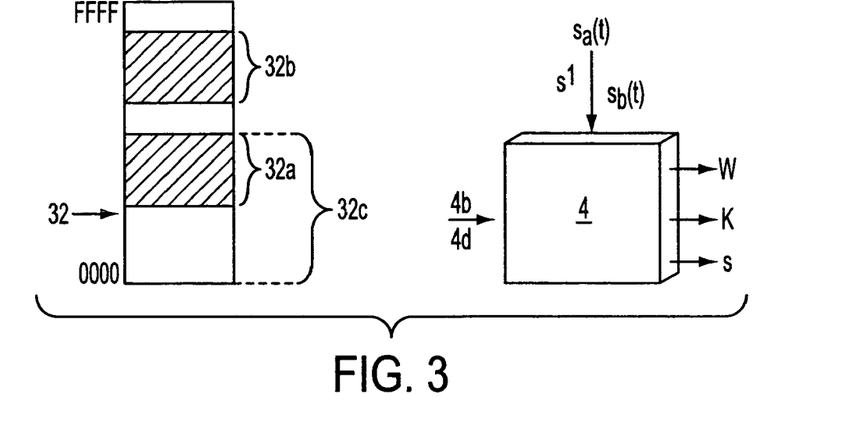
FIG. 3 is a self-explanatory diagram of the operating method of the modification of a memory area accessible to a decoder.
Figure 3A:
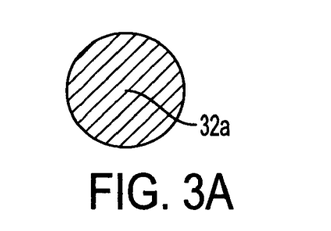
FIG. 3a, 3b, and 3c illustrate exemplary database segments
Figure 3B:
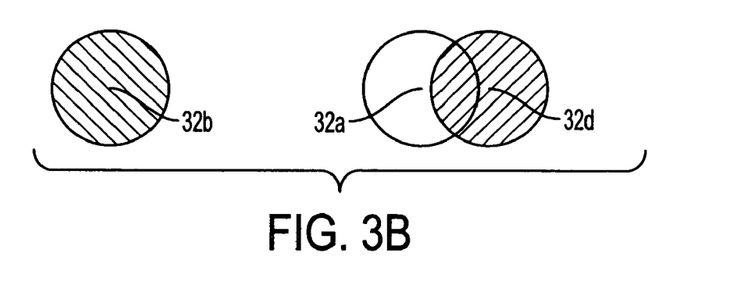
Figure 3C:
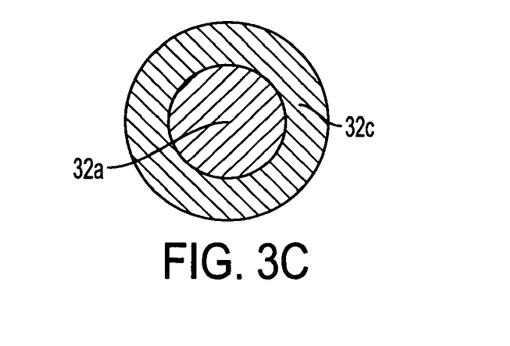

Said FIGS. 3a, 3b, and 3c illustrate according to the theory of sets which information segment of the database is accessible via said control 70 subsequently to said initial data segment 32a. A second database segment 32b that is completely separate from said first database segment 32a can be made available. A partly overlapping combination 32d can also be provided, as well as an expanded database 32c comprising said database segment 32a and supplementing additional use information. The second set of use information of said database thus formed, is made available to said recognition 4 according to FIG. 3, in order to allow a database segment, i.e. an entry in the database, to be associated to said recorded first signal (of function 2), that is still present, to the time interval T1 not determined in the first analysis, or to a new signal $s_2(t)$. The evaluation provides a new set of recognition data 19 comprising a word W, a related confidence value K, and the attribute of the semantic category S, which attribute as such remains unchanged. In a request 20, the confidence value is again compared with the threshold value which, in most cases leads to a recognition result for W, resulting in a requested information via a path 40,50,50a or 40,50,50b (and initiation of a technical function).

Path 59a: An already mentioned second expansion or branching possibility of the request 60, whether a semantic category is present, is provided via a signal path or program path 59a. When a semantic category is present, a voice output over a loudspeaker 31 can be provided, said voice output being adapted to the semantic category. A surname can specifically be asked for, a place can specifically be asked for, a department can specifically be asked for, depending on the number of semantic categories provided. Said voice output is controlled by a function 30. Said loudspeaker 31a can be separate, but it can also be a loudspeaker 50a, which is not separately illustrated in the functional sequence chart.

Due to the initiated action, the system is adapted to adjust itself as a system response, such that a second signal input expected to be supplied by a user, which input corresponds to a second signal flow $s_b(t)$, can be processed more easily, more rapidly and more selectively. Consequently, the system has already finished its adjustment and is no longer dependent on the reflections of the user. The adjustment or modification of the system according to the signal path 59a, 30, 31a in connection with an iteration 35, which leads to the functional blocks 2 and 5, is sufficient for a subsequent optimized recognition. In the easiest case, the expected signal $s_b(t)$ corresponds again and only to the signal segment s1, if the surname which could not be recognized before, is repeated, because the signal request 31 only asked for a person. Thus, a new signal is supplied to the recognition module 4 via a microphone 1, a signal transmission line 1a, and a recording 2 of this shorter signal, so that now a new use information 18 comprising a word, a semantic category and a confidence value can be supplied to 19, the confidence value being substantially higher, preferably even so high as to exceed the threshold value, and to allow a signal output or function 50a, 50b corresponding to a word W1 to be initiated.

For such an operating process, the database can remain unmodified with respect to its accessible area. However, it can also be modified to an expansion or branching 59 according to a functional block 70 in the sense of the above description, within the conditions described in connection with FIG. 3.

For the described process control, this function is effected by a database selection 5 which makes a new area of use information accessible to said module 4 via a control line 4a,4b.

In the following, the semantic category shall be described in more detail.

At 70, the semantic category determines which segment of the database 32 is associated for the decoding 4, for recognition of the voice signal $s_a$ or $s_b$. In case of a telephone system, e.g. the attributes name, forename, companies, department, functions are provided in case of a train information system, the attributes type of train, places, times of a day (morning, afternoon, night) can be provided. Other attributes can be allocated (e.g. also languages), depending on the field of application.

The unknown voice signal segment s1 or the new shorter segment $s_b(t)$, which was recognizable with respect to its attribute or is known, but not with respect to its concrete content, is supplied by a decoder via a function 2, the database 32 being addressed correspondingly (e.g. via a control of the addressing area of the decoder 4).

When using the described information system, it is noticed that a user is only rarely interested in all information of the database 32. Therefore, a profile 10a, 10b is provided in a profile collection of a memory 10, said profile collection describing, delimiting, or supplementing a subset of the first segment 32a of the database. Said profile can be either user-oriented or motivated by other structural properties of the user. Due to the predetermined different segments 32a,32b, . . . , a structure of the database 32 is obtained. The information request initially operates with limited information 32a which, preferably, however, is user-oriented. Said limited information is not the end of the available information, but the beginning of localizing signal segments which are possibly not present (and which cannot be associated with words) in other areas of the database.

Initially, however, only said information area 32a influenced by said profile is accessible for the word recognition in said decoder 4. In order to avoid confusions between recognized words, an acoustic measure is adopted for word recognition, said acoustic measure being designated as confidence value K. If the signal segment s1 is recognized with an insufficient confidence value (said confidence value being below a predetermined threshold value), the searched word is regarded as "not recognized", and an attribute evaluation is effected with regard to the second attribute of "semantic category", which is part of the recognition result 19.

Said semantic category is of a very rough nature and is in direct connection with the table entries of the database.

The change-over to another area, in order to allocate the voice segment not recognized in the first area, for retrieving the information segment requested by the speaker, also operates in multiple stages. Several further areas 32b,32c,32d can be provided which are used consecutively.

According to another embodiment, the attribute S1 can predetermine one of said areas in which the search is continued. When the system according to FIG. 1 reaches the last area, without retrieving an entry W1 corresponding to the first voice signal segment s1 or the information relating to said voice signal segment via the acoustic decoder 4, the system returns and asks the user to supply the further voice signal. The new check of the newly spoken signal is initially carried out in said first information area 32a, at least single-stage iteratively expanded by the above-described control 70 using the semantic category.

In FIG. 2, the voice output $s_{31}(t)$ is symbolically illustrated in connection with the system response by a voice output 30,31a depending on the semantic category. Said voice output corresponds to the time interval T1 and to the signal segment s1 in said time interval. The correspondence is to be understood such that a signal segment $T_1^*$ is inherent in the signal flow $s_{31}(t)$, said signal segment $T_1^*$ carrying the correspondence to said signal segment s1 not recognized with sufficient confidence. Said "correspondence" is explained by an example. The unknown signal segment is the surname itself, e.g. "Fischer" or "Jones". The signal response in case of an insufficient confidence and a voice output according to the recognized semantic category S1, is a request "Which person do you want to talk to?", the term "person" corresponding to the signal flow in the segment $T_1^*$. Therefore, the correspondence is a semantic category, which is output by voice, in accordance with a non-recognized name, which corresponds to a segment s1. Of course, said signal segments are not equal with respect to their temporal flow, they are only comparable with respect to their meaning, the semantic category abstractly defining the content of the signal segment s1.

After the signal output $S_{31}(t)$, the system expects a second voice signal $s_b(t)$. Said voice signal is of a considerably lower complexity. The complete information of the database with several, particularly all information areas 32a,32b,32c,32d can be made accessible to the decoder 4 for decoding. This kind of restrictive dialog strategy permits to only mention one single database field, instead of simultaneously indicating different database fields (such as for example indicating the name, forename and company name). For a recognition of the content of said single database field by a voice recognition 4, not only the words of the information segment made accessible by the profile 10a, 10b in said first information area 32a are used, but all values of the complete database 32, possibly also without said first area 32a.

The determinations that the individual information areas 32a,32b,32c,32d are proper subsets of the complete information 32 result from the structure of the database 32. Normally it is useful to make said first area 32a dependent on the user, as described before. Said dependency is achieved by a profile. Said profile describes the typical behavior of a certain user, when using the dialog system according to FIG. 1. The profile specifies (influences) a subset of the accessible database. When a group of users can be treated identically, said profile applies to several users actually having comparable properties.

The described semantic categories characterize the actually not recognized voice signal segment s1 as an attribute with regard to its generic meaning (its semantic category), without said voice recognition recognizing the actually spoken word in said decoder 4. Prior to such an association, a meaning (semantic) of a prior known finite quantity of meanings is attributed to each word in said database 32, so that only a finite quantity of meanings can be attributed. Each of said meanings is designated as semantic category.

Figure 4:
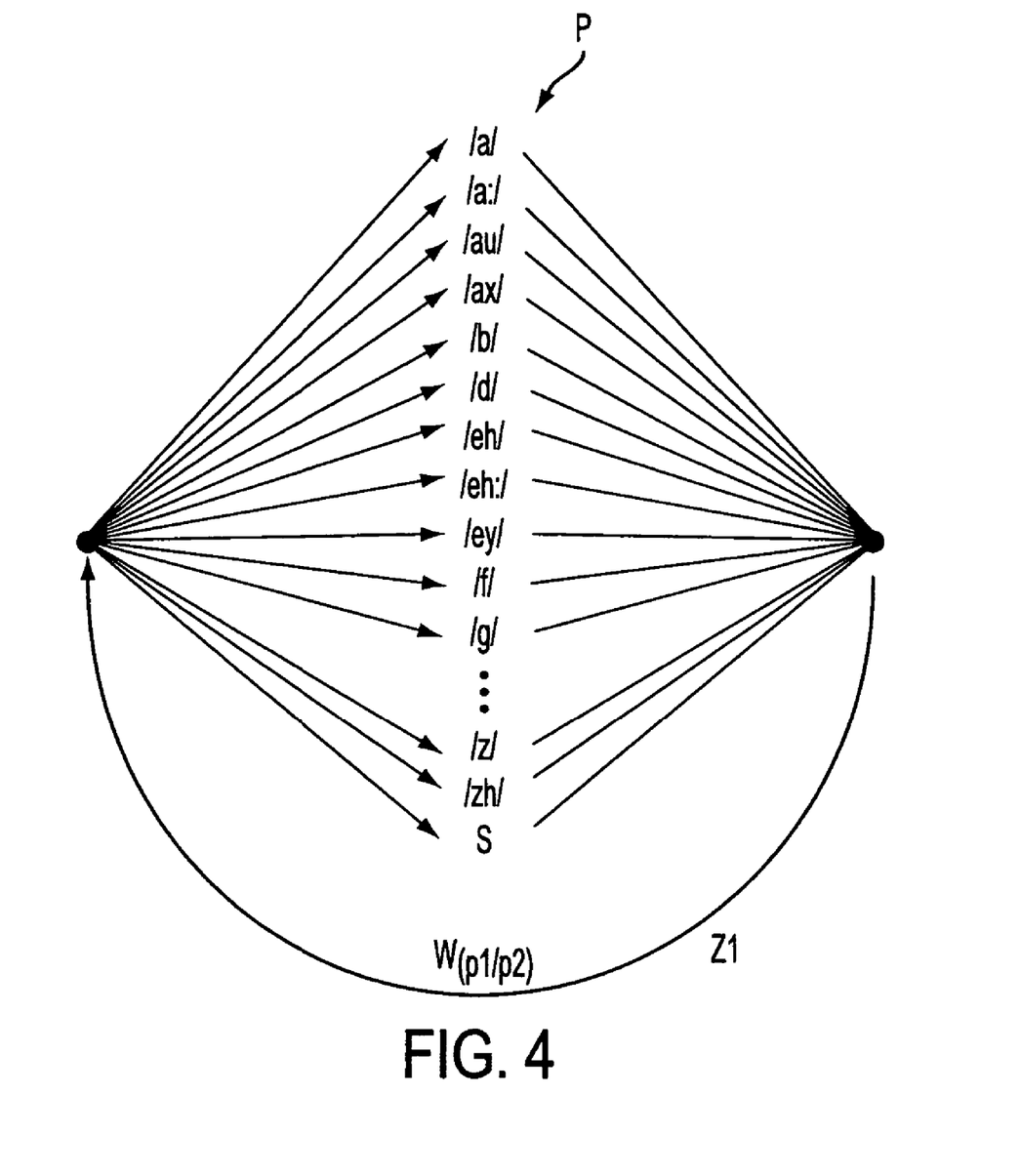
FIG. 4 is an illustration of an acoustic model for an OOV.

Within said recognition module 4, different OOV models can be applied. Different semantic categories also have other OOV models. Such an OOV model is an acoustic model in which several (different) part models are connected in parallel, as shown in FIG. 4. Frequently, all voice models are used, a part model generally being designated as P. According to FIG. 4, a multitude of voice models is provided. They can be dependent on the language, in the present embodiment, German voice models (according to German language) being used as a basis. Some such voice models are /a/, /a:/, /ai/, /au/, /ax/, /b/, /d/, /eh/, /eh:/, /ey/, /f/, /g/, . . . /r/, /s/, /sh/, /t/, . . . /z/ and /zh/. A loop Z1 is provided to adapt the OOV model of FIG. 4 to cover a time interval s1 of variable length, said loop covering the occurrence of a sequence of part models P in said OOV model. At the loop transition Z1, between the left and the right node, a transition probability is defined which is designated W(p1|p2). Said transition probability is between the left and the right node of FIG. 4. It provides information on the probability of transition from one voice model p2 to a subsequent voice model p1, each of which, as a respective part model, is an element of the OOV model with all part models P. An OOV model is therefore completely defined by the quantity of all part models P and by an evaluation or predetermination of the transition probability W(p1|p2) for all p1,p2 in P.

The different OOV models are applied within the recognition module 4. Different semantic categories also have different OOV models, which is to be illustrated based on an embodiment. For said embodiment, the semantic categories "Strasse"[1] and "Stadt"[2] in German language are provided and shall be compared. A major part of all streets or roads (names of the streets or roads) have a suffix "Strasse", as for example the Goethestrasse. Therefore, transitions probabilities between the elements of said suffix are given, which are as follows:

$W_1(p1="t"|p2="s")$
$W_2(p1="r"|p2="t")$
$W_3(p1="a"|p2="r")$
$w_4(p1="s"|p2="a")$
$W_5(p1="s"|p2="s")$
$W_6(p1="e"|p2="s")$

[1] remark of translator: German term "Strasse"=street, road
[2] remark of translator: German term "Stadt"=city, town When evaluating the suffix "Strasse", said probabilities are substantially higher in the OOV model of the semantic category "Strasse", than in the OOV model of the other semantic category "Stadt". Therefore, a semantic category can be associated.

In addition, a differentiation of the part models P themselves is useful, if a differentiation of semantic categories of English names and German names (as two different semantic categories) is to be used. Instead of the described voice models P according to FIG. 4, English voice models are used, which are not separately illustrated here.

With the OOV models adapted to or predetermined for each semantic category, word recognition of database segments not contained in said database 32 is more robust with respect to a time interval T1, the modeling being more adequate for said semantic category.

If, according to the embodiment of FIG. 1, at said path 59, a voice signal segment s1 of a first voice signal $s_a(t)$ is present, which is not contained in said first information area 32a of said database 32, a further information area of said database is activated as a second information area. The not-contained status corresponds to a recognition result 18 provided by said recognition module 4, the semantic category and the confidence value being determined, said confidence value, however, not exceeding the threshold value. At least an acoustic model according to FIG. 4 is predetermined, particularly, however, several acoustic models being provided, each of which forms an individual semantic category or is attributed to said category. As described, the different semantic categories can also be determined by different languages, when selecting voice models specific for a language.

The method according to FIG. 1 can also be operated such that a non-attributable voice signal segment s1 in said first information area 32a of said database 32 is followed by an unspecific voice output as a re-inquiry, which is made via a channel 80,31. Thereupon, the system does not modify. A further analysis with a signal similar to said signal $s_a(t)$ shall provide a reliable recognition of the now expected second voice signal to be obtained. Thus, the system is adapted to adjust itself without interference of human intellectual action, only based on predetermined system processes to obtain a subsequent reliable recognition that is more robust and more rapid. An intellectual contribution of the user is not decisive, his reaction with respect to its perplexity being in any case substantially reduced due to the output of the re-inquiry signal at 31 or 31a, so that only for this reason, an improvement of the recognizability is obtained. The loudspeakers 31,31a can also be identical.

As described above, the complete area of the database can be accessible for the substantially reduced perplexity of the second voice signal, however, a process can also be initiated, according to which said second voice signal is again checked by said voice model 4 and said first data area 32a of information with respect to retrieving an entry.

The described variants can also be combined, such as the iterative determination with return to said first information area 32a, with or without dialog-inquiry 31 or 31a.

We claim:

1. A method for controlling an information system during an output of stored information segments via a signaling device, the method comprising the steps of
   storing information in a database for being requested;
   providing a first voice signal having a first voice signal segment and providing a voice recognition module for decoding the first voice signal;
   organizing the information in said database such that a limited first information area of stored information is initially accessible to said first voice signal segment;
   specifying at least one information segment from the stored information as a first data segment by a decoded first voice signal segment and provide the specified information segment as output;
   activating a further information area of said database as a second information area from the stored information, when said first data segment corresponding to the first voice signal segment of said first voice signal is not contained in said limited first information area, wherein the activation of said second information area of the database is at least co-dependent on a semantic category of said voice signal segment;
   said semantic category being determined by the voice recognition module when decoding the voice signal segment of the first voice signal, to associate the semantic category to the voice signal segment.

2. The method of claim 1, wherein the output of stored information is communicated as a control output.

3. The method of claim 1, wherein said output of information is controlling a technical device.

4. The method of claim 1, wherein after activating said further information area, a third information area is activated if said specified information segment is also not available from said further activated information area.

5. The method of claim 1, wherein said first information area or said second information area is a real subset of the information stored in said database.

6. The method of claim 1, wherein said first limited information area of stored information of said database is at least partly determined according to a user profile.

7. The method of claim 1, wherein there is provided a threshold value or a confidence value calculated from said voice signal by a decoder, to allow a comparison.

8. The method of claim 1, wherein a status of not-containing said first data segment results from a recognition of acoustic models, each of said acoustic models being associated to an individual semantic category.

9. The method of claim 1, wherein said voice signal is decoded in a decoder using acoustic models, for providing a confidence value in said semantic category for said first voice signal segment of the first voice signal.

10. The method of claim 1, wherein a threshold value is provided for testing a confidence value determined by a voice recognition as an acoustic decoder, wherein said confidence value is compared to said threshold value.

11. The method of claim 10, wherein said comparison with said threshold value is effected, and depending on the comparison, the semantic category of a certain word being related to said first voice signal segment is evaluated.

12. The method of claim 1, wherein an information segment specified by said first voice signal segment is output via a control output, when a voice segment characterizing said specified information segment is found as a word in one of said first limited information area, said second information area and another information area activated later.

13. The method of claim 12, wherein the activation of said second information area depends on the semantic category of said voice signal segment, which voice signal segment having no correspondent in said limited first information area.

14. The method of claim 1, wherein the activation of said further information area depends on the semantic category of said voice signal segment, which voice signal segment had no corresponding word in said limited first information area as the voice signal segment could not be determined with a sufficient level of confidence.

15. The method of claim 1, wherein after activating said further information area, only a shortened voice signal segment is evaluated in a decoder, for specifying in said further information area an information segment corresponding to said voice signal segment.

16. The method of claim 15, wherein the shortened voice signal segment is the voice signal segment of said first voice signal, evaluated in the decoder, for specifying the corresponding information segment.

17. The method of claim 1, wherein after detecting a confidence value and a certain semantic category of said voice signal segment, a perceivable signal is output, said perceivable signal being dependent on the semantic category, if the confidence value is too small.

18. The method of claim 1, wherein said activated further information area is different from said first limited information area by one of larger, offset, and fully different.

19. The method of claim 1, wherein after evaluating the semantic category by said voice recognition module, a further voice signal segment is supplied for being evaluated having less perplexity.

20. The method of claim 19, wherein further voice signal segment supplied for being evaluated, has temporal length thereof being shortened with respect to said first voice signal evaluated by said voice recognition module.

21. The method of claim 1, wherein the activation of said second information area depends on the semantic category of said voice signal segment, which voice signal segment could not be determined, recognized, specified or selected with sufficient confidence.

22. A method for controlling an information system during an output of stored information segments via a signaling device, the method comprising the steps of
storing information in a database suitable for being requested;
providing a voice recognition system;
specifying an information segment as a first data segment via a first voice signal provided to said voice recognition system from a user;
providing the first data segment as a control output;
organizing the information in said database such that initially only a first information area of stored information is accessible to said first voice signal, for selecting said specified information segment from said first information area;
associating a semantic category as one of a group of properties to a voice signal segment within said voice signal with no dialogue requests to said user, when an information segment corresponding to said voice signal segment is not contained in said first information area; and
activating a second information area,
wherein said second activated information area is different from said first accessible information area and dependent on the semantic category, as associated to said voice signal segment.

23. The method of claim 22, wherein after evaluating the semantic category by said voice recognition system, a further voice signal segment is supplied for being evaluated1 a temporal length of the further segment being shortened with respect to said first voice signal evaluated by said voice recognition system.

24. A method for controlling a technical device via a voice initiated action, comprising the steps of
storing information in a database suitable for being requested;
providing a voice recognition system;
specifying an information segment as a first data segment via a first voice signal provided to said voice recognition system from a user;
providing the first data segment as a converted control signal for said technical device;
organizing the information in said database such that initially only a first information area of stored information is accessible to said first voice signal, for selecting said specified information segment from said first information area;
associating a semantic category as one of a group of properties to a voice signal segment within said voice signal with no dialogue requests to said user that provided the first voice signal, when an information segment corresponding to said voice signal segment of said first voice signal is not contained in said first information area; and
activating a second information area, wherein said second activated information area is different from said first information area, and dependent on the semantic category, as associated to said voice signal segment.

25. A method for controlling a technical device via a voice initiated action, the method comprising the steps of
storing information in a database for being requested;
providing a first voice signal having a first voice signal segment and providing a voice recognition module for decoding the voice signal;
organizing the information in said database such that a limited first information area of stored information is initially accessible to said first voice signal segment;
specifying at least one information segment from the stored information as a first data segment by a decoded first voice signal segment and provide the specified information segment as output;
activating a further information area of said database as a second information area from the stored information, when said first data segment corresponding to the first voice signal segment of said first voice signal is not contained in said limited first information area, wherein the activation of the second information area of the database is at least co-dependent on a semantic category of said voice signal segment;

said semantic category being determined by the voice recognition module when decoding the voice signal segment of the first voice signal, to associate the semantic category to the voice signal segment.

26. The method of claim 25, wherein the output is converted into a control signal for said technical device.

* * * * *

UNITED STATES PATENT AND TRADEMARK OFFICE
CERTIFICATE OF CORRECTION

PATENT NO. : 7,587,322 B2  Page 1 of 1
APPLICATION NO. : 10/415709
DATED : September 8, 2009
INVENTOR(S) : Schimmer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Fourteenth Day of December, 2010

David J. Kappos
*Director of the United States Patent and Trademark Office*